United States Patent [19]

Guioth et al.

[11] Patent Number: 4,732,788

[45] Date of Patent: Mar. 22, 1988

[54] PROCESS FOR COATING SUBSTRATE AND AN AQUEOUS COATING COMPOSITION BASED ON A CATIONIC BINDER

[75] Inventors: Chantal H. Guioth, Rantigny; Etienne G. Maze, Bruil le Vert; Jean J. Trescol, Ogent sur Oise, all of France

[73] Assignee: Akzo NV, Arnhem, Netherlands

[21] Appl. No.: 882,280

[22] Filed: Jul. 7, 1986

[30] Foreign Application Priority Data

Jul. 5, 1985 [NL] Netherlands .................. 8501937

[51] Int. Cl.⁴ .................. B05D 3/02; C08L 37/00
[52] U.S. Cl. .................. 427/388.2; 204/181.7; 524/458
[58] Field of Search .................. 204/180.2, 181.7; 427/388.2, 388.4; 522/95

[56] References Cited

U.S. PATENT DOCUMENTS

| | | | |
|---|---|---|---|
| 3,850,770 | 11/1974 | Juna et al. .................. | 522/95 X |
| 3,864,133 | 2/1975 | Hisamatsu et al. .................. | 522/95 X |
| 3,954,588 | 5/1976 | Hazan et al. .................. | 204/181 |
| 4,134,816 | 1/1979 | Rosso et al. .................. | 204/181 C |
| 4,337,296 | 6/1982 | Varadhachary .................. | 427/372.2 X |
| 4,399,239 | 8/1983 | Herwig et al. .................. | 524/113 X |
| 4,511,446 | 4/1985 | Abbey et al. .................. | 204/181 |
| 4,517,343 | 5/1985 | Schupp et al. .................. | 525/488 |
| 4,524,092 | 6/1985 | Cesca et al. .................. | 427/388.2 |
| 4,554,212 | 11/1985 | Diefenbach et al. .................. | 428/413 |
| 4,576,989 | 3/1986 | Noll et al. .................. | 427/388.2 X |
| 4,579,889 | 4/1986 | Kaffen et al. .................. | 523/414 |
| 4,600,485 | 7/1986 | Patzschke et al. .................. | 204/181.7 |
| 4,608,139 | 8/1986 | Craun et al. .................. | 204/181.7 |
| 4,608,314 | 8/1986 | Turpin et al. .................. | 428/425.8 |
| 4,624,762 | 11/1986 | Abbey et al. .................. | 204/181.7 |
| 4,661,223 | 4/1987 | Zedler et al. .................. | 204/181.7 |

FOREIGN PATENT DOCUMENTS

58-075148  5/1983  Japan .................. 522/95

*Primary Examiner*—Thurman K. Page
*Attorney, Agent, or Firm*—Parkhurst & Oliff

[57] ABSTRACT

A process is provided for coating an electrically conductive substrate with an aqueous coating composition containing a cationic binder wherein the binder is obtained by polymerization of 100 parts by weight of a specified monomer mixture in the presence of 0.5 to 25 parts by weight of a polyurethane having 2-5 acryloyl groups or methacryloyl groups, a molecular weight of 400-7000 and a molecular weight per (meth)acryloyl group of at least 200. The invention also pertains to the aqueous composition as such.

21 Claims, No Drawings

PROCESS FOR COATING SUBSTRATE AND AN AQUEOUS COATING COMPOSITION BASED ON A CATIONIC BINDER

The invention relates to a process for coating an electrically conductive substrate with an aqueous coating composition based on a cationic binder. The binder is obtained by polymerization of a monomer mixture in the presence of a polyethylenically unsaturated compound, the amino groups present in the binder being at least partially neutralized with an acid. The monomer mixture consists of (a) 1-30% by weight of a hydroxy(cyclo)alkyl (meth)acrylate of which the (cyclo)alkyl group contains 2-8 carbon atoms, (b) 4-45% by weight of an amino (meth)acrylate of the formula

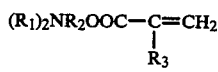

where at least one of the groups $R_1$ is an organic group containing 1-12 carbon atoms and the other group $R_1$ is an organic group containing 1-12 carbon atoms or a hydrogen atom, or the two groups $R_1$, together with the nitrogen atom attached thereto, from a heterocyclic group, $R_2$ is a hydrocarbon group (c) containing 2-12 carbon atoms and $R_3$ is a hydrogen atom or a methyl group, 0-80% by weight of a monovinyl aromatic hydrocarbon containing 8-14 carbon atoms, and (d) 0-50% by weight of a different monoethylenically unsaturated monomer containing 2-20 carbon atoms. A process of the type indicated above is known from European Patent Application No. 104,683, the polyethylenically unsaturated compound proposed in it being a particular polyester. The resulting coating satisfactorily covers edges and displays good resistance to chemical attack and outdoor exposure. It has now been found, however, that the use of a different polyethylenically unsaturated compound results in a further improvement of the gloss while the above properties are kept at the same level.

The process according to the invention is characterized in that the polyethylenically unsaturated compound is a polyurethane having 2-5 acryloyl groups herein-after (meth)acryloyl groups), a molecular weight of 400-7000 and a molecular weight per (meth)acryloyl group of at least 200. This polyurethane is present in an amount of 0.5 to 25 parts by weight per 100 parts by weight of the monomer mixture.

Examples of hydroxy(cyclo)-alkyl (meth)acrylates suitable for use in the monomer mixture include hydroxyethyl acrylate, hydroxyethyl methacrylate, hydroxypropyl acrylate, hydroxypropyl methacrylate, hydroxybutyl acrylate, hydroxyhexyl acrylate, hydroxyoctyl acrylate and hydroxycyclohexyl acrylate. It is preferred that use should be made of hydroxyalkyl (meth)acrylates, more particularly hydroxyethyl acrylate and/or hydroxypropyl methacrylate. It is preferred that the monomer mixture should contain 5-24% by weight of hydroxy(cyclo)alkyl (meth)acrylate. As used herein, the term "hydroxy(cyclo)alkyl (meth)acrylate" refers to hydroxyalkyl acrylates, hydroxyalkyl methacrylates, hydroxycycloalkyl acrylates and/or hydroxycycloalkyl methacrylates.

Examples of amino (meth)acrylates suitable for use in the monomer mixture include methylaminoethyl (meth)acrylate, dimethylaminoethyl (meth)acrylate, diethylaminoethyl (meth)acrylate, propylaminoethyl (meth)acrylate, tert. butylaminoethyl (meth)acrylate, hexylaminobutyl (meth)acrylate, cyclohexylaminoethyl (meth)acrylate, dimethylcyclohexylaminoethyl (meth)acrylate, octylaminoethyl (meth)acrylate, dodecylaminoethyl (meth)acrylate, pyridylethyl (meth)acrylate and the chloride or sulphate of trimethylammoniumethyl (meth)acrylate. It is preferred that use should be made of a (di)alkylamino (meth)acrylate of which the alkyl group(s) has (have) 1-4 carbon atoms. More particularly, use is made of a $\beta$-(di)alkylaminoethyl (meth)acrylate of which the alkyl group(s) has (have) 1-4 carbon atoms, for example: $\beta$-dimethylaminoethyl (meth)acrylate and $\beta$-diethylaminoethyl (meth)acrylate. It is preferred that the monomer mixture should contain 7-35% by weight, more particularly 7-28% by weight of amino (meth)acrylate.

The monomer mixture may contains as a third component a monovinyl aromatic hydrocarbon having 8-14, preferably 8-10 carbon atoms. Representative examples include styrene, $\alpha$-methyl styrene, vinyl toluene and vinyl naphthalene. It is preferred that use should be made of styrene and/or vinyl toluene. It is preferred that the monomer mixture should contain 10-70% by weight of monovinyl aromatic hydrocarbon.

Finally, the monomer mixture contains 0-50, preferably 0-45% by weight of some other monoethylenically unsaturated monomer having 2-20 carbon atoms, such as acrylic or methacrylic esters, for example: methyl methacrylate, ethyl acrylate, glycidyl methacrylate, butyl acrylate, 2-ethylhexyl acrylate, dodecyl acrylate and hexadecyl acrylate; nitriles, for example: acrylonitrile and methacrylonitrile; and compounds such as vinyl chloride, vinyl acetate and vinyl propionate; carboxylic acids such as acrylic acid, methacrylic acid, crotonic acid, itaconic acid and maleic acid may generally be applied in an amount not higher than about 1% by weight.

The 2-5 acryloyl groups or methacryloyl groups-containing polyurethanes to be used according to the invention (hereinafter referred to as polyurethane (meth)acrylates) may be prepared in any convenient manner. By a polyurethane is to be understood here a compound having at least 2 urethane groups per molecule. Representative polyurethane (meth)acrylates include the adducts of a hydroxyl group-containing (meth)acrylic ester of a polyol to an at least bifunctional isocyanate compound. If such adducts should still contain free isocyanate groups, these compounds should be reacted with a hydroxyl compound having at least 1 hydroxyl group. The polyurethane (meth)acrylate should, of course, satisfy the requirements of the present invention. Such methods of preparation are known per se to a man skilled in the art and need not be further described here.

As suitable hydroxyl group-containing (meth)acrylic esters of a polyol on the basis of which the adduct to an at least bifunctional isocyanate compound is formed may be mentioned esters of acrylic acid and/or methacrylic acid and di-, tri- or polyvalent polyols such as polyester diols, polyester polyols, polyether diols, polyether polyols, polyurethane diols, polyurethane polyols, polybutadiene diols, polybutadiene polyols and hydroxyl compounds such as ethylene glycol, propylene glycol, diethylene glycol, tetramethylene diol, neopentyl glycol, hexamethylene diol, cyclohexane diol, dimethylol cyclohexane bis(4-hydroxycyclohexyl)methane, glycerol, trimethylol ethane, trimethylol propane and pentaerythritol. Such hydroxyl compounds are described, among other places, in Lackkunstharze by H. Wagner and H. F. Sarx, 5th Edition, 1971 (Carl Hanser Verlag, München). It is preferred that use should be made of hydroxyl group-containing (meth)acrylic esters of diols having 2 or 3 carbon atoms. As examples of at least bifunctional isocyanate compounds that may be used for the above-envisaged adduct may be mentioned aliphatic, cycloaliphatic or aromatic di-, tri- or tetraisocyanates such as 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethylhexamethylene diisocyanate, 2,4,4-trimethylhexamethylene diisocyanate, dodecamethylene diisocyanate, $\omega,\omega'$-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexyl methane-4,4'-diisocyanate, 3,3'-dimethyl-dicyclohexyl methane-4,4'-diisocyanate, a toluene diisocyanate, 1,3-bis(isocyanatomethyl)benzene, a xylylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis-(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenyl methane, 3,3'-dimethyl-4,4'-diisocyanatodiphenyl methane, a diisocyanatonaphthalene, the adduct of 2 molecules of a diisocyanate, for instance hexamethylene diisocyanate or isophorone diisocyanate, and a diol such as ethylene glycol, the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer), the adduct of 1 molecule of trimethylol propane and 3 molecules of isophorone diisocyanate, compounds such as 1,3,5-triisocyanatobenzene, 2,4,6-triisocyanatotoluene, isocyanurate group-containing isocyanate compounds and the adduct of 1 molecule of pentaerythritol and 4 molecules of toluene diisocyanate, or mixtures of 2 or more of the above-envisaged isocyanate compounds. It is preferred that use should be made of a diisocyanate or triisocyanate containing 8–36 carbon atoms.

As examples of other suitable polyurethane (meth)acrylates may be mentioned the adducts of a (meth)acrylate compound having an isocyanate group to an adduct of an epoxy compound to an alkanol amine. Examples of the isocyanate group-containing (meth)acrylate compound required for the preparation of said polyurethane (meth)acrylates include the afore-described adducts of a hydroxyl group-containing (meth)acrylic ester to a di- or polyisocyanate, in which case the adduct should still contain at least 1 isocyanate group. Also suitable starting compounds are other isocyanate group-containing (meth)acrylate compounds, such as isocyanatoethyl methacrylate.

As examples of epoxy compounds required for the preparation of the polyurethane (meth)acrylates envisaged here may be mentioned the glycidyl ethers of (cyclo)aliphatic or aromatic hydroxyl compounds such as ethylene glycol, glycerol, cyclohexane diol, mononuclear di- or polyvalent phenols, bisphenols such as Bisphenol-A and Bisphenol-F, and glycidyl group-containing resins, such as polyesters or polyurethanes, containing at least 1 glycidyl group per molecule, or mixtures of the above-envisaged epoxy resins. The epoxy resins are known to a man skilled in the art and need not be further described here. It is preferred that use should be made of the monoglycidyl ether of Bisphenol-A. As examples of the alkanol amines required for the formation of the adduct of an epoxy compound to an alkanol amine may be mentioned secondary amines containing at least 1 alkanol group per molecule. If in that molecule only 1 alkanol group is present, then the other substituent to the nitrogen atom is an alkyl group or cycloalkyl group having 1–12, preferably 1–4 carbon atoms. It is preferred that the alkanol group should contain 1–4 carbon atoms. More particularly, use is made of diethanol amine. It is preferred that the binder should be obtained by polymerization of 0.5–25 parts by weight of the polyurethane (meth)acrylate per 100 parts by weight of the monomer mixture.

Polymerization of the monomer mixture in the presence of the polyurethane methacrylate may be carried out by methods known in themselves, use being made of a free radical initiator in an organic solvent at a temperature generally in the range of 10° to 130° C., use being made of ultraviolet radiation, if desired. For instance, polymerization may take place with continuous addition of a mixture of the monomers and initiator to a solution of the polyurethane (meth)acrylate and the monomer composition that is chosen may be constant or variable.

Examples of suitable solvents include polar solvents such as ketones, for instance: methylethyl ketone; alcohols such as the ethyl ether or the butyl ether of ethylene glycol; and the ethyl ether of ethylene glycol acetate. Generally, use is made of initiators which have such a half-life period at the chosen polymerization temperature that throughout the polymerization reaction a certain amount of initiator is present. Preferably, the polymerization is continued up to a conversion of the monomer mixture of at least 95%, more particularly 98–100%. Examples of suitable radical initiators include 2.2'-azo-bis-isobutyronitrile, benzoyl peroxide, tert. butyl peroctoate and methylethyl ketone peroxide. The initiator is usually employed in an amount of 0.2–8, preferably 1–7% by weight, based on the weight of the monomer mixture. Optionally, the initiator may be added to the polymerization mixture batchwise.

For the resulting polymerization product to be made cationic and water soluble, the amino groups present should at least partly be neutralized. This is generally done in a known manner and with the aid of an inorganic or organic acid. Examples of suitable acids include boric acid, phosphoric acid, sulphuric acid, sulphurous acid, hydrochloric acid, formic acid, acetic acid, propionic acid, glycolic acid, thioglycolic acid, diglycolic acid, lactic acid, thiopropionic acid, tartaric acid, malic acid or citric acid. Generally, use is made of mixtures of acids. It is preferred that use should be made of lactic acid. Neutralization may be carried out stepwise, if desired. It is preferred that 30–100% of the available amino groups of the binder should be neutralized. The pH of the composition is generally in the range of 3–7, preferably 4–5.

The preparation of the aqueous coating composition is effected in a simple manner, for instance by adding deionized water to the at least partly neutralized binder to a concentration level of about 30-50% by weight. Subsequently, the resulting solution is diluted with water to a commonly used concentration of 1-35% by weight, preferably 5-20% by weight.

The aqueous coating composition further contains a curing agent for the hydroxyl groups-containing polymerization product. Representative curing agents include blocked polyisocyanates. Examples of suitable polyisocyanates include aliphatic, cycloaliphatic or aromatic diisocyanates such as trimethylene diisocyanate, tetramethylene diisocyanate, hexamethylene diisocyanate; trimethyl hexamethylene diisocyanate, 1,2-propylene diisocyanate, 2,3-butylene diisocyanate, ω,ω'-dipropyl ether diisocyanate, 1,2-cyclohexane diisocyanate, 1,4-cyclohexane diisocyanate, isophorone diisocyanate, dicyclohexylmethane-4,4'-diisocyanate, 3,3'-dimethyl-dicyclohexylmethane-4,4'-diisocyanate, xylylene diisocyanate, 1,5-dimethyl-2,4-bis-(isocyanatomethyl)benzene, 1,5-dimethyl-2,4-bis(2-isocyanatoethyl)lbenzene, 1,3,5-triethyl-2,4-bis-(isocyanatomethyl)benzene, 4,4'-diphenylmethane diisocyanate, 2,4-toluene diisocyanate, 2,6-toluene diisocyanate, naphthalene diisocyanate, dianisidine diisocyanate, 4,4'-diphenylether diisocyanate.

Also suitable for use are higher functional polyisocyanates such as the adduct of 3 molecules of hexamethylene diisocyanate and 1 molecule of water (available under the trademark Desmodur N of Bayer), the adduct of 1 molecule of trimethylol propane and 3 molecules of toluene diisocyanate (available under the trademark Desmodur L of Bayer) and the adduct of 1 molecule of trimethylol propane and 3 molecules of isophorone diisocyanate, and compounds such as 1,3,5-triisocyanatobenzene and 2,4,6-triisocyanatotoluene.

Examples of suitable, known blocking agents for the polyisocyanate include alcohols, lactams, hydroxamates and oximes. As examples of suitable alcohols, which may be aliphatic, cycloaliphatic or alkylaromatic, may be mentioned propanol, 1-butanol, 2-butanol, isobutanol and pentanols. Examples of suitable lactams include ε-caprolactam, butyrolactam and 2-pyrrolidone. As examples of suitable oximes may be mentioned ethylmethyl ketoxime. Preference is given to the use of blocked polyisocyanates as curing agents in cases where the aqueous coating composition is to be applied to the substrate cataphoretically. Other curing agents are, for instance, N-methylol and/or N-methylol ether groups-containing aminoplasts obtained by reacting an aldehyde, for example formaldehyde, with an amino or amido groups-containing compound such as melamine, urea, N,N'-ethylene urea, dicyandiamide and benzoguanamine; for the preparation of these compounds see, for instance, Houben-Weyl, Methoden der organischen Chemie, Volume 14/2, pp. 319-371 (1963). It is preferred that the afore-described compounds should entirely or partly be etherified with alcohols having 1 to 6 carbon atoms, for example with methanol, ethanol, n-propanol, isopropanol, n-butanol, isobutanol, amyl alcohol, hexanol or mixtures of the above-envisaged alcohls. Especially, use can be made of a methylol melamine having 4 to 6 methylol groups per melamine molecule, at least 3 methylol groups being etherified with methanol, ethanol, propanol or butanol. More particularly, use can be made of a hexaalkoxymethyl melamine wth the alkoxy group having 1 to 4 carbon atoms.

The aqueous coating composition may contain conventional adjuvants and additives, for instance: surface active compounds, anti-sag agents, dispersing agents, antioxidants, dispersion stabilizers, co-solvents, pigments and dyes. As examples of suitable pigments may be mentioned iron oxide, lead oxide, strontium chromate, carbon black, titanium dioxide, talc, silica, barium sulphate, cadmium yellow, cadmium red and phthalocyanine pigments.

As substrate there is used in the present process an electrically conductive substrate, which may for instance be of a pretreated or non-pretreated metal or alloy, such as iron, steel, zinc plated iron, copper, brass or aluminium, or an electrically conductive synthetic material or rubber. The aqueous coating composition may be applied to an electrically conductive substrate for instance by brushing, spraying, dipping, electrostatic spraying, but preferably by cataphoresis. Cataphoresis may be carried out in the usual manner, for instance at a voltage of 50-500, preferably 100-350, and an initial current density of 0.1-40 A/m². If desired, however, the aqueous coating composition may be applied to any electrically non-conductive substrate.

After the coating has been applied to the substrate, it is baked at a temperature of, for instance, 90°-250° C., preferably 110°-200° C. The time required for baking depends on the baking temperature and generally varies between about 5 and 45 minutes.

The invention also pertains to an aqueous coating composition based on a cationic binder. The binder is obtained by polymerization of a monomer mixture in the presence of a polyethylenically unsaturated compound, the amino groups present in the binder being at least partially neutralized with an acid. The monomer mixture consists of (a) 1-30% by weight of a hydroxy(cyclo)alkyl (meth)acrylate of which the cyclo)alkyl group has 2-8 carbon atoms, (b) 4-45% by weight of an amino (meth)acrylate of the formula:

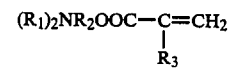

wherein at least one of the groups $R_1$ is an organic group having 1-12 carbon atoms and the other group $R_1$ is an organic group having 1-12 carbon atoms or a hydrogen atom, or the two groups $R_1$, together with the nitrogen atom attached thereto, form a heterocyclic group, $R_2$ is a hydrocarbon group containing 2-12 carbon atoms and $R_3$ is a hydrogen atom or a methyl group, (c) 0-80% by weight of a monovinyl aromatic hydrocarbon containing 8-14 carbon atoms, and (d) 0-50% by weight of a different monoethylenically unsaturated monomer containing 2-20 carbon atoms. The polyethylenically unsaturated compound is a polyurethane having 2-5 acryloyl groups or methacryloyl groups, a molecular weight of 400-7000 and a molecular weight per (meth)acryloyl group of at least 200. The polyurethane is present in an amount of 0.5-25 parts by weight per 100 parts by weight of the monomer mixture.

The invention will be further described in, but not limited by, the following examples. Unless otherwise indicated, all parts and percentages are by weight. The cured coatings obtained according to the Examples were tested for hardness in conformity with NF T 30-016, for adhesion in accordance with DIN 53151, for flexibility in accordance with NF T 30.040 (cylindrical bending), for gloss in accordance with ASTM D 523 (angle of 60°) and for resistance to corrosion by exposure for 400 hours to a salt spray in conformity with ASTM-B-117-64 (the results are expressed as $C_xYA_z$, where x and z denote the degree of rust formation in mm, respectively on either side of the scratch and on the edge of the panel, and the value y=10 means that there was no blistering). The edge covering was assessed by microscope. The thickness of the coating was measured in the cured state. The Gardner Holdt viscosity was measured at a temperature of 25° C.

EXAMPLE 1

In a reactor provided with a stirrer and a reflux condenser 40.45 parts of polypropylene oxide diol of a molecular weight of 1200 were heated to a temperature of 50° C. Subsequently, 11.73 parts of tolulyl diisocyanate were added at a rate such that the temperature of the reactor contents did not rise to above 50° C. The reaction was continued at a temperature of 50° C. until the isocyanate content was 5.3–5.5%. Then 0.05 parts of dibutyltin laurate and 7.82 parts of hydroxyethyl acrylate were gradually added and the reaction was continued until the isocyanate content was less than 0.1%. Finally, 40 parts of 2-butoxyethanol were added and a 60%-solution of isocyanate-free product was obtained.

In a second step 3.0 parts of the previously prepared solution of the polyurethane (meth)acrylate were mixed with 37.6 parts of monobutyl ether of ethylene glycol and the mixture was heated to a temperature of 100° C. Next, a mixture of 32.1 parts of styrene, 11.3 parts of hydroxyethyl acrylate, 8.0 parts of methyl methacrylate, 6.7 parts of dimethylaminoethyl methacrylate and 1.05 parts of 2.2'-azo-bis-isobutyronitrile was introduced in such a way that the temperature of the reactor contents did not rise to above 110° C.

After the monomer mixture had been added, the contents of the reactor were kept at 100° C. for 1 hour. Finally, a mixture of 0.6 parts of 2.2'-azo-bis-isobutyronitrile and 1,2 parts of monobutyl ether of ethylene glycol was added to the reactor contents in 2 equal portions, each of them over a period of 1 hour, in the process of which and for 2 more hours the reaction mixture was kept at a temperature of 100°–110° C. The resulting binder solution had a solids contents of 59.9%; and upon dilution with monobutyl ether of ethylene glycol it had a Gardner Holdt viscosity of $Z_4$–$Z_5$.

A coating composition was prepared by intermixing 64.0 parts of the afore-described binder solution, 14.0 parts of an 80%-solution of the adduct completely blocked with ε-caprolactam of 3 molecules of hexamethylene diisocyanate and 1 molecule of water in the methyl ether of propylene glycol acetate, 35.0 parts of rutile titanium dioxide, 6.0 parts of monobutyl ether of ethylene glycol, 1.5 parts of an 85%-aqueous solution of phosphoric acid and deionized water in an amount such that a composition having a solids content of 12.0% was obtained.

The aqueous coating composition was applied to a steel panel (Bonder 132) by cataphoretic deposition at a voltage of 250, a temperature of 25° C. and an initial current density of 20 A/m² to a coating thickness of 35–40 μm and subsequently cured for 25 minutes at a temperature of 180° C.

EXAMPLE 2

In a reactor provided with a stirrer and a reflux condenser, 20.9 parts of hydroxyethyl acrylate were slowly added to a solution of 31.3 parts of tolulyl diisocyanate in 20.0 parts of monoethyl ether of propylene glycol acetate at a rate such that the temperature of the reactor contents did not rise to above 55° C. The reaction was continued at a temperature of 50°–55° C. until the isocyanate content was 10.5%. Then, 0.04 parts of dibutyltin laurate and 27.8 parts of tetrahydroxyfunctional polycaprolactone having a molecular weight of 600 were gradually added and the reaction was continued until the isocyanate content was less than 0.1%. Finally, 33.3 parts of monobutyl ether were added and an 80%-solution of the isocyanate-free product was obtained.

In a second step 1.25 parts of the previously prepared solution of the polyurethane (meth)acrylate were mixed with 37.7 parts of monobutyl ether of ethylene glycol and the mixture was heated to a temperature of 100° C. Subsequently, a mixture of 32.2 parts of styrene, 11.3 parts of hydroxyethyl acrylate, 8.1 parts of methyl methacrylate, 6.8 parts of dimethylaminoethyl methacrylate and 1.17 parts of 2.2'-azo-bis-isobutyronitrile was introduced into the reactor in such a way that the temperature of the reactor contents did not rise to above 110° C. After the monomer mixture had been added, the reactor contents were kept at a temperature of 100° C. for 1 more hour. Finally, a mixture of 0.6 parts of 2.2'-azo-bis-isobutyronitrile and 1.2 parts of monobutyl ether of ethylene glycol was added to the reactor contents in 2 equal portions, each of them over a period of 1 hour, in the process of which and for 2 more hours the reaction mixture was kept at a temperature of 100°–110° C. The resulting binder solution had a solids content of 59.4%; and upon dilution with monobutyl ether of ethylene glycol it had a Gardner Holdt viscosity of $Z_3$–$Z_4$.

The coating composition based on the resulting binder solution was prepared in the same way as indicated in Example 1; and so were the application and the baking processes. The measured properties of the coating obtained are given in the Table.

EXAMPLE 3

In a reactor provided with a stirrer and a reflux condenser 40 parts of hydroxyethyl acrylate were mixed with 60 parts of toluly diisocyanate at a temperature of 45° C. The resulting reaction product had an isocyanate content of 14.3%; its Gardner Holdt viscosity was $Z$–$Z_1$.

In a next step 20.3 parts of the previously prepared product were mixed with the adduct of 32.4 parts of bisglycidyl ether of Bisphenol-A of a molecular weight of 900 and 7.3 parts of diethanol amine in the presence of 17,0 parts of methylisobutyl ketone and 0.03 parts of dibutyltin laurate. The reaction was continued at 60° C. until no more isocyanate could be detected and subsequently 14.2 parts of monobutyl ether of ethylene glycol were added. The resulting 59.5%-solution of the polyurethane (meth)acrylate had a Gardner Holdt viscosity of $Z$–$Z_1$.

Then 1.66 parts of that solution were mixed with 37.8 parts of monobutyl ether of ethylene glycol and the mixture was heated to a temperature of 100° C. Subsequently, a mixture of 32.3 parts of styrene, 11.3 parts of hydroxyethyl acrylate, 8.1 parts of methyl methacrylate, 6.8 parts of dimethylaminoethyl methacrylate and 0.9 parts of 2.2'-azo-bis-isobutyronitrile was introduced into the reactor in such a way that the temperature of the reactor contents did not exceed 110° C. After the monomer mixture had been added, the reactor contents were kept at a temperature of 100° C. for 1 more hour. Finally, a mixture of 0.6 parts of 2.2'-azo-bis-isobutyronitrile and 1.2 parts of monobutyl ether of ethylene glycol was added to the contents of the reactor in two equal portions, each of them over a period of 1 hour, in the process of which and for 2 more hours the reaction mixture was kept at a temperature of 100° C. Obtained was a binder solution having a solids content of 59.2% which upon dilution with monobutylether of ethylene glycol had a Gardner Holdt viscosity of $Z_3-Z_4$.

A coating composition based on the resulting binder solution was prepared, applied and baked as indicated in Example 1. The measured properties of the coating are given in the Table.

EXAMPLE 4

The procedure of Example 2 were repeated, except that use was made of tolulyl diisocyanate in an amount of 18.3 parts, the ethyl ether of propylene glycol acetate in an amount of 15.0 parts and the hydroxyethyl acrylate in an amount of 12.2 parts. The polycaprolactone compound was prepared by means of a tertiary amine having 2 hydroxyl groups and was used in an amount of 29.5 parts.

In a subsequent step 3.33 parts of the previously prepared solution of the polyurethane (meth)acrylate were mixed with 37.3 parts of monobutyl ether of ethylene glycol and the mixture was heated to a temperature of 100° C. Next, a mixture of 31.9 parts of styrene, 11.2 parts of hydroxyethyl acrylate, 8.0 parts of methyl methacrylate, 6.7 parts of dimethylaminoethyl methacrylate and 1.02 parts of 2.2'-azo-bis-isobutyronitrile was introduced into the reactor in such a way that the temperature of the reactor contents did not rise to above 110° C. After the monomer mixture had been added, the reactor contents were kept at a temperature of 100° C. for 1 more hour. Finally, a mixture of 0,6 parts of 2.2'-azo-bis-isobutyronitrile and 1.2 parts of monobutyl ether of ethylene glycol was added to the contents of the reactor in 2 equal portions, each of them over a period of 1 hour, in the process of which and for 2 more hours the reaction mixture was kept at a temperature of 100° C. Obtained was a binder solution having a solids content of 59.6%, which upon dilution with monobutyl ether of ethylene glycol to a solids content of 50% had a Gardner Holdt viscosity of $Z_4-Z_5$.

The preparation, application and baking of a coating composition based on the resulting binder solution were carried out as indicated in Example 1. The measured properties of the coating are given in the Table.

TABLE

| | Examples | | | |
|---|---|---|---|---|
| | 1 | 2 | 3 | 4 |
| Hardness | 310 | 330 | 300 | 310 |
| Adhesion | GtO | GtO | GtO | GtO |
| Flexibility | <20 | <5 | <5 | <5 |
| Edge covering | good | excellent | excellent | good |
| Gloss | >80 | >80 | >80 | >80 |
| Salt spray test | $C_3 10A_1$ | $C_2 10A_1$ | $C_2 10A_0$ | $C_1 10A_0$ |

We claim:

1. A process for coating a substrate, comprising applying to said substrate an aqueous coating composition based on a cationic binder obtained by polymerization of a monomer mixture in the presence of 0.5 to 25 parts by weight of a polyethylenically unsaturated compound per 100 parts by weight of the monomer mixture, said monomer mixture consisting of (a) 1–30% by weight of a hydroxy(cyclo)alkyl (meth)acrylate of which the (cyclo)alkyl group contains 2–8 carbon atoms, (b) 4–45% by weight of an amino (meth)acrylate of the formula

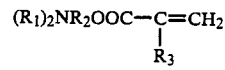

where at least one of the groups $R_1$ is an organic group containing 1–12 carbon atoms and the other group $R_1$ is an organic group containing 1–12 carbon atoms or a hydrogen atom, or the two groups $R_1$, together with the nitrogen atom attached thereto, form a heterocyclic group, $R_2$ is a hydrocarbon group containing 2–12 carbon atoms and $R_3$ is a hydrogen atom or a methyl group, (c) 0–80% by weight of a monovinyl aromatic hydrocabon containing 8–14 carbon atoms, and (d) 0–50% by weight of a different monoethylenically unsaturated monomer containing 2–20 carbon atoms;

said polyethylenically unsaturated compound being a polyurethane having 2–5 acryloyl groups or methacryloyl groups, a molecular weight of 400–7000 and a molecular weight per (meth)acryloyl group of at least 200;

amino groups in said binder being at least partially neutralized with an acid.

2. A process according to claim 1, wherein the hydroxy(cyclo)alkyl (meth)acrylate is at least one member selected from the group consisting of hydroxyethyl acrylate and hydroxypropyl methacrylate.

3. A process according to claim 1, wherein the monomer mixture contains 5–24% by weight of hydroxy(cyclo)alkyl (meth)acrylate.

4. A process according to claim 1, wherein the amino (meth)acrylate is a (di)alkylamino (meth)acrylate of which the alkyl group(s) has (have) 1–4 carbon atoms.

5. A process according to claim 1, wherein the amino (meth)acrylate used is a β-(di)alkylaminoethyl (meth)acrylate of which the alkyl group(s) has (have) 1–4 carbon atoms.

6. A process according to claim 1, wherein the monomer mixture contains 7–35% by weight of amino (meth)acrylate.

7. A process according to claim 1, wherein the monovinyl aromatic hydrocarbon has 8–10 carbon atoms.

8. A process according to claim 1, wherein the monovinyl aromatic hydrocarbon is at least one member selected from the group consisting of styrene and vinyl toluene.

9. A process according to claim 1, wherein the monomer mixture contains 10–70% by weight of the monovinyl aromatic hydrocarbon.

10. A process according to claim 1, wherein the monomer mixture contains 0–45% by weight of a different monoethylenically unsaturated monomer.

11. A process according to claim 1, wherein 100 parts by weight of the monomer mixture are polymerized in the presence of 1–10 parts by weight of the acryloyl groups- or methacryloyl groups-containing polyurethane.

12. A process according to claim 1, wherein the coating composition is applied to the substrate by cataphoretic deposition at a voltage of 50–500 and an initial current denisty of 0.1–40 A/m².

13. A process according to claim 1, wherein the coating applied to the substrate is baked at a temperature of 90°-250° C.

14. An aqueous coating composition based on a cationic binder obtained by polymerization of a monomer mixture in the presence of 0.25-25 parts by weight of a polyethylenically unsaturated compound per 100 parts by weight of the monomer mixture, said monomer mixture consisting of (a) 1-30% by weight of a hydroxy(cyclo)alkyl (meth)acrylate of which the (cyclo)alkyl group has 2-8 carbon atoms, (b) 4-45% by weight of an amino (meth)acrylate of the formula:

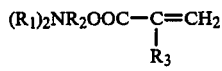

wherein at least one of the groups $R_1$ is an organic group having 1-12 carbon atoms and the other group $R_1$ is an organic group having 1-12 carbon atoms or a hydrogen atom, or the two groups $R_1$, together with the nitrogen atom attached thereto, form a heterocyclic group, $R_2$ is a hydrocarbon group containing 2-12 carbon atoms and $R_3$ is a hydrogen atom or a methyl group, (c) 0-80% by weight of a monovinyl aromatic hydrocarbon containing 8-14 carbon atoms, and (d) 0-50% by weight of a different monoethylenically unsaturated monomer containing 2-20 carbon atoms;

said polyethylenically unsaturated compound being a polyurethane having 2-5 acryloyl groups or methacryloyl groups, a molecular weight of 400-7000 and a molecular weight per (meth)acryloyl group of at least 200;

amino groups present in said binder being at leaast partially neutralized with an acid.

15. A composition according to claim 14, wherein the binder is obtained by polymerization of 100 parts by weight of the monomer mixture in the presence of 1-10 parts by weight of the polyurethane.

16. A process according to claim 1, wherein at least one of the groups $R_1$ is a hydrocarbon group containing 1-12 carbon atoms and the other group $R_1$ is a hydrocarbon group containing 1-12 carbon atoms or a hydrogen atom.

17. A process according to claim 1, wherein said monomer mixture includes said monovinyl aromatic hydrocarbon containing 8-14 carbon atoms.

18. A process according to claim 1, wherein said monomer mixture includes said different monoethylenically unsaturated monomer containing 2-20 carbon atoms.

19. A composition according to claim 14, wherein at least one of the groups $R_1$ is a hydrocarbon group containing 1-12 carbon atoms and the other group $R_1$ is a hydrocarbon group containing 1-12 carbon atoms or a hydrogen atom.

20. A composition according to claim 14, wherein said monomer mixture includes said monovinyl aromatic hydrocarbon containing 8-14 carbon atoms.

21. A composition according to claim 14, wherein said monomer mixture includes said monovinyl aromatic hydrocarbon containing 8-14 carbon atoms.

* * * * *

UNITED STATES PATENT AND TRADEMARK OFFICE
CERTIFICATE OF CORRECTION

PATENT NO. : 4,732,788            Page 1 of 2

DATED : March 22, 1988

INVENTOR(S) : Chantal H. GUIOTH et al

It is certified that error appears in the above-identified patent and that said Letters Patent is hereby corrected as shown below:

Column 1, line 27, delete "(c)";

line 29, after "group," insert --(c)--;

line 46, change "herein-after (meth)acryloyl groups)," to --or methacryloyl groups (hereinafter "(meth)acryloyl groups"),--.

Column 2, line 18, change "contains" to --contain--;

line 42, change "referred to as polyurethane" to --"polyurethane--;

line 43, change "(meth)acrylates)"" to --(meth)acrylates")--.

Column 6, line 33, change "cyclo)alkyl" to --(cyclo)alkyl--.

Column 7, line 13, change "denser" to --denser,--;

line 38, change "1,2" to --1.2--.

Column 8, line 49, change "17,0" to --17.0--.

Column 9, line 35, change "0,6" to --0.6--.

UNITED STATES PATENT AND TRADEMARK OFFICE
CERTIFICATE OF CORRECTION

PATENT NO. : 4,732,788

DATED : March 22, 1988

INVENTOR(S) : Chantal H. GUIOTH et al

It is certified that error appears in the above-identified patent and that said Letters Patent is hereby corrected as shown below:

Column 10, line 41, delete "used".

Column 12, line 3, change "leaast" to --least--.

Signed and Sealed this

Sixth Day of September, 1988

Attest:

DONALD J. QUIGG

Attesting Officer

Commissioner of Patents and Trademarks